(12) United States Patent
Murakami et al.

(10) Patent No.: US 12,090,580 B2
(45) Date of Patent: Sep. 17, 2024

(54) WELDING APPARATUS AND WELDING METHOD

(71) Applicant: KABUSHIKI KAISHA YASKAWA DENKI, Kitakyushu (JP)

(72) Inventors: Masafumi Murakami, Fukuoka (JP); Fuminori Inagaki, Fukuoka (JP)

(*) Notice: Subject to any disclaimer, the term of this patent is extended or adjusted under 35 U.S.C. 154(b) by 357 days.

(21) Appl. No.: 16/583,279

(22) Filed: Sep. 26, 2019

(65) Prior Publication Data
US 2020/0101550 A1    Apr. 2, 2020

(30) Foreign Application Priority Data

Sep. 28, 2018   (JP) ................. 2018-183589

(51) Int. Cl.
*B23K 9/09*    (2006.01)
*B23K 9/29*    (2006.01)

(52) U.S. Cl.
CPC .............. *B23K 9/092* (2013.01); *B23K 9/295* (2013.01)

(58) Field of Classification Search
CPC .......... B23K 9/09; B23K 9/092; B23K 9/093; B23K 9/095; B23K 9/0953; B23K 9/0956; B23K 9/295
See application file for complete search history.

(56) References Cited

U.S. PATENT DOCUMENTS

| | | | |
|---|---|---|---|
| 5,495,091 A * | 2/1996 | Tabata | B23K 9/092 219/130.51 |
| 6,051,810 A * | 4/2000 | Stava | B23K 9/0286 219/137 PS |

(Continued)

FOREIGN PATENT DOCUMENTS

| | | | |
|---|---|---|---|
| CN | 101585108 | | 11/2009 |
| CN | 102430840 A | * | 5/2012 |

(Continued)

OTHER PUBLICATIONS

Office Action issued in European Patent Application No. 19200019.8 dated May 7, 2021.

(Continued)

*Primary Examiner* — Dana Ross
*Assistant Examiner* — Kuangyue Chen
(74) *Attorney, Agent, or Firm* — SOEI PATENT & LAW FIRM

(57) ABSTRACT

A welding apparatus includes a welding power source configured to output current between a consumable electrode and a workpiece; and circuitry. The circuitry is configured to control the welding power source to repeat a sequence including: outputting a positive peak current from the workpiece to the consumable electrode during a positive peak period; outputting a positive base current from the workpiece to the consumable electrode and subsequently outputting a negative base current from the consumable electrode to the workpiece during a first base period, an absolute value of the positive base current and the negative base current being less than the positive peak current; and outputting a negative peak current from the consumable electrode to the workpiece during a negative peak period following the first base period, an absolute value of the negative peak current being greater than the absolute value of the positive base current and the negative base current.

20 Claims, 8 Drawing Sheets

(56) References Cited

U.S. PATENT DOCUMENTS

| | | | | |
|---|---|---|---|---|
| 7,842,903 | B2* | 11/2010 | Myers | B23K 9/1062 219/130.21 |
| 8,338,750 | B2* | 12/2012 | Shiozaki | B23K 9/09 219/130.33 |
| 2002/0030043 | A1* | 3/2002 | Tong | B23K 9/124 219/130.33 |
| 2005/0051525 | A1* | 3/2005 | Yamada | B23K 9/1675 219/130.51 |
| 2007/0056944 | A1* | 3/2007 | Artelsmair | B23K 9/092 219/130.5 |
| 2007/0102408 | A1* | 5/2007 | Peters | B23K 9/1062 219/130.51 |
| 2008/0156781 | A1* | 7/2008 | Artelsmair | B23K 9/091 219/137.71 |
| 2008/0223829 | A1 | 9/2008 | Wilhelm | |
| 2010/0155383 | A1 | 6/2010 | Shiozaki et al. | |
| 2012/0074115 | A1* | 3/2012 | Kazmaier | B23K 9/09 219/130.51 |
| 2013/0112675 | A1* | 5/2013 | Peters | B23K 9/0953 219/130.51 |
| 2014/0021182 | A1 | 1/2014 | Peters et al. | |
| 2014/0076858 | A1* | 3/2014 | Peters | B23K 9/092 219/74 |
| 2014/0083987 | A1 | 3/2014 | Dodge et al. | |
| 2014/0263237 | A1 | 9/2014 | Daniel et al. | |
| 2018/0214969 | A1 | 8/2018 | Fleming et al. | |
| 2020/0055135 | A1* | 2/2020 | Takada | B23K 9/0732 |

FOREIGN PATENT DOCUMENTS

| | | | |
|---|---|---|---|
| DE | 102006050297 | | 4/2008 |
| EP | 1658919 | | 5/2006 |
| EP | 1958724 | | 8/2008 |
| EP | 2202024 | | 6/2010 |
| JP | S63-157765 | | 6/1988 |
| JP | H6-063747 | | 3/1994 |
| JP | 2008-531283 | | 8/2008 |
| JP | 2009-285701 | | 12/2009 |
| JP | 2010-075983 | | 4/2010 |
| JP | 2010-234441 | | 10/2010 |
| JP | 2012-096276 | | 5/2012 |
| JP | 2013136085 | A * | 7/2013 |
| JP | 2015-530252 | | 10/2015 |
| JP | 3203250 | | 3/2016 |
| JP | 2018-118317 | | 8/2018 |
| JP | 6372447 | | 8/2018 |
| WO | 2006/089322 | | 8/2006 |
| WO | 2014/045111 | | 3/2014 |
| WO | 2014/140733 | | 9/2014 |

OTHER PUBLICATIONS

Extended Search Report in corresponding European Application No. 19200019.8, dated Feb. 19, 2020.
Extended Search Report in corresponding European Application No. 19200047.9, dated Feb. 26, 2020.
Soei Patent and Law Firm, Statement of Related Matters, dated Dec. 5, 2019.
Office Action issued in European Patent Application No. 19200019.8, dated Jun. 28, 2022.
Office Action issued in Chinese Patent Application No. 201910911827.0, dated Jun. 7, 2022 (with English partial translation).
Office Action issued in Chinese Patent Application No. 201910911976.7, dated Jun. 7, 2022 (with English partial translation).
Edited by Defu He, "Introduction to Welding and Joining Engineering", Shanghai Municipal Commission of Education, Dec. 31, 1998 (with English partial translation).
Office Action issued in Chinese Patent Application No. 201910911827.0 dated Dec. 3, 2021 (with English partial translation).
Office Action issued in Chinese Patent Application No. 201910911827.7 dated Dec. 3, 2021 (with English partial translation).
Office Action issued in U.S. Appl. No. 16/583,278 dated Dec. 21, 2021.
Office Action issued in Japanese Patent Application No. P2018-183589, dated Mar. 8, 2022 (with English partial translation).
Office Action issued in Japanese Patent Application No. P2018-183603, dated Mar. 1, 2022 (with English partial translation).
Tomoyuki Ueyama, Manabu Tanaka, et al., "Control Method of Arc Stabilization in AC/DC Pulsed MIG Welding", Quarterly journal of the Japan Welding Society, Japan Welding Society, vol. 23, No. 1, https://www.jstage.jst.go.jp/article/qjjws/23/1/23_1_53/_pdf, Dec. 12, 2005, p. 53-p. 64.
Office Action issued in Japanese Patent Application No. P2018-183589 dated Sep. 13, 2022 (with English partial translation).

* cited by examiner

WELDING APPARATUS AND WELDING METHOD

CROSS-REFERENCE TO RELATED APPLICATION

This application is based upon and claims the benefit of priority from Japanese Patent Application No. 2018-183589, filed on Sep. 28, 2018, the entire contents of which are incorporated herein by reference.

BACKGROUND

Field

The present disclosure relates to a welding apparatus and a welding method.

Description of the Related Art

Japanese Unexamined Patent Publication No. 2009-285701 discloses an AC pulse arc welding apparatus that alternately applies a positive polarity current and a reverse polarity current between a consumable electrode and a welding target. This apparatus includes a controlling means for executing a first step of outputting a pulse current in reverse polarity, then executing a second step of outputting a base current in reverse polarity to generate a short circuit, then executing a third step of outputting a pulse current in positive polarity, and then executing a fourth step of outputting a base current in positive polarity.

SUMMARY

An example welding apparatus disclosed herein may include a welding power source configured to output current between a consumable electrode and a workpiece; and circuitry. The circuitry may be configured to control the welding power source to repeat a sequence including: outputting a positive peak current from the workpiece to the consumable electrode during a positive peak period; outputting a positive base current from the workpiece to the consumable electrode and subsequently outputting a negative base current from the consumable electrode to the workpiece during a first base period, an absolute value of the positive base current and the negative base current being less than the positive peak current; and outputting a negative peak current from the consumable electrode to the workpiece during a negative peak period following the first base period, an absolute value of the negative peak current being greater than the absolute value of the positive base current and the negative base current.

An example welding method is also disclosed herein. The welding method may include: outputting current between a consumable electrode and a workpiece from a welding power source; and controlling the welding power source to alternately repeat a sequence. The sequence may include: outputting a positive peak current from the workpiece to the consumable electrode during a positive peak period; outputting a positive base current from the workpiece to the consumable electrode and subsequently outputting a negative base current from the consumable electrode to the workpiece during a first base period, an absolute value of the positive base current and the negative base current being less than the positive peak current; and outputting a negative peak current from the consumable electrode to the workpiece during a negative peak period following the first base period, an absolute value of the negative peak current being greater than the absolute value of the positive base current and the negative base current.

DETAILED DESCRIPTION

Figure 1:
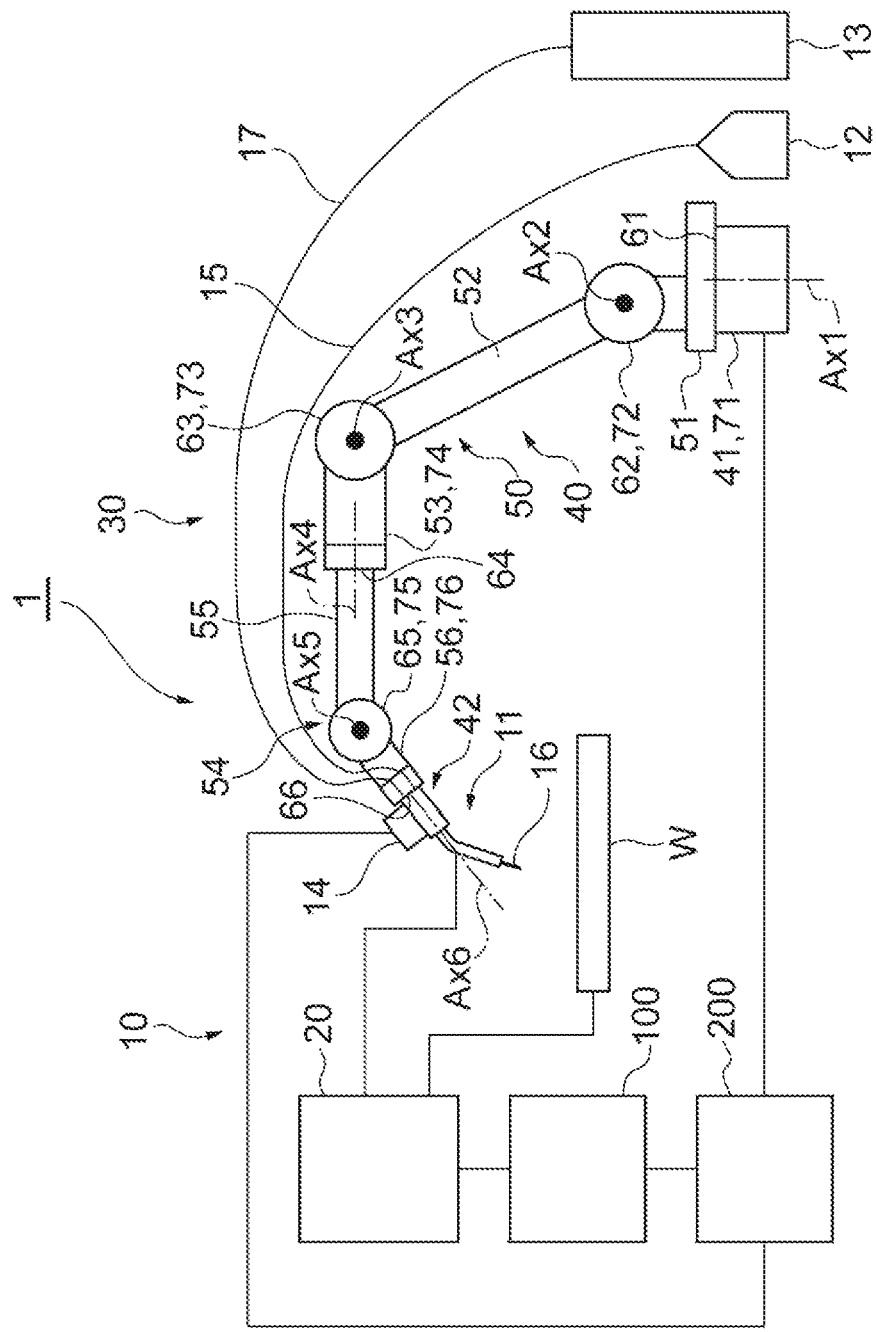
FIG. 1 is a schematic diagram illustrating an example configuration of a welding system.

Hereinafter, with reference to the drawings, the same elements or similar elements having the same function are denoted by the same reference numerals, and redundant description will be omitted.

Welding System

An example welding system 1 illustrated in FIG. 1 is a system for automatically executing at least part of arc welding work of a welding target (hereinafter referred to as "workpiece W"). The welding system 1 includes a welding apparatus 10 and a robot system 30.

The robot system 30 includes a robot 40 and a robot controller 200 that controls the robot 40. The robot 40 arranges a welding tool (for example, a welding torch 11) at a welding target position. For example, the robot 40 is a six-axis vertical articulated robot, and has a base 41, a tool holder 42, and an articulated arm 50. The base 41 is installed, for example, on a floor surface in a work area of the robot 40. Note that the base 41 may be installed in a movable part, such as a cart.

The articulated arm 50 connects the base 41 and the tool holder 42, and changes a position and an attitude of the tool holder 42 with respect to the base 41. The articulated arm 50 is, for example, a serial link type, and includes a pivoting portion 51, a first arm 52, a second arm 53, a wrist portion 54, and actuators 71, 72, 73, 74, 75, and 76.

The pivoting portion 51 is provided on an upper portion of the base 41 so as to be pivotable about a vertical axis Ax1. In some examples, the articulated arm 50 has a joint 61 which enables the pivoting portion 51 to pivot about the axis Ax1. The first arm 52 is connected to the base 41 so as to be swingable about an axis Ax2 that intersects (for example, is orthogonal to) the axis Ax1. For example, the articulated arm 50 may have a joint 62 which enables the first arm 52 to swing about the axis Ax2. Note that the term "intersect" as used here also includes a case where axes may be in a twisted relationship with each other, as in what is called solid crossing. The second arm 53 is connected to an end of the first arm 52 so as to be swingable about an axis Ax3 intersecting the axis Ax1. In some examples, the articulated arm 50 has a joint 63 which enables the second arm 53 to swing about the axis Ax3. The axis Ax3 may be parallel to the axis Ax2.

The wrist portion 54 has a pivoting arm 55 and a swinging arm 56. The pivoting arm 55 extends from an end of the second arm 53 along the center of the second arm 53 and is pivotable about an axis Ax4 along the center of the second arm 53. In some examples, the articulated arm 50 has a joint 64 that enables the pivoting arm 55 to pivot about the axis Ax4. The swinging arm 56 is connected to an end of the pivoting arm 55 so as to be swingable about an axis Ax5 that intersects (for example, is orthogonal to) the axis Ax4. For example, the articulated arm 50 may have a joint 65 which enables the swinging arm 56 to swing about the axis Ax5.

The tool holder 42 is connected to an end of the swinging arm 56 so as to be pivotable about an axis Ax6 along the center of the swinging arm 56. In some examples, the articulated arm 50 has a joint 66 which enables the tool holder 42 to pivot about the axis Ax6.

The actuators 71, 72, 73, 74, 75, and 76 use, for example, an electric motor as a power source, and drive a plurality of the joints 61, 62, 63, 64, 65, and 66 of the articulated arm 50, respectively. For example, the actuator 71 causes the pivoting portion 51 to pivot about the axis Ax1, the actuator 72 causes the first arm 52 to swing around the axis Ax2, the actuator 73 causes the second arm 53 to swing around the axis Ax3, the actuator 74 causes the pivoting arm 55 to pivot around the axis Ax4, the actuator 75 causes the swinging arm 56 to swing around the axis Ax5, and the actuator 76 causes the tool holder 42 to pivot around the axis Ax6.

The configuration of the robot 40 described above is merely an example. The robot 40 may have other configuration in which a position and an attitude of the tool holder 42 with respect to the base 41 are changed by the articulated arm 50. For example, the robot 40 may be a seven-axis robot obtained by adding a redundant axis to the six-axis vertical articulated robot.

The welding apparatus 10 is an apparatus that supplies a consumable electrode to a welding point and supplies power for welding between the consumable electrode and the workpiece W. The consumable electrode is an electrode which is melted and consumed as a welding material. For example, the welding apparatus 10 includes the welding torch 11, a pail pack 12, a gas cylinder 13, a feeding apparatus 14, a welding power source 20, and a welding controller 100 that controls the welding power source 20. Note that, although the welding controller 100 may be separate from the welding power source 20 in FIG. 1, in other examples the welding controller 100 may be incorporated in the welding power source 20.

The welding torch 11 is held by the tool holder 42 as described above, and guides a consumable electrode (for example, a welding wire 16) to a welding point. The pail pack 12 supplies the welding wire 16 to the welding torch 11. For example, the pail pack 12 accommodates the coiled welding wire 16 and is connected to the welding torch 11 via the conduit cable 15.

The gas cylinder 13 supplies shielding gas to the welding torch 11. The shielding gas may be, for example, carbon dioxide, argon or mixed gas of these. For example, the gas cylinder 13 is connected to the welding torch 11 via a gas hose 17.

The feeding apparatus 14 sends the welding wire 16 supplied to the welding torch 11 to the workpiece W side. For example, the feeding apparatus 14 is provided on the welding torch 11 and performs forward feeding and reverse feeding of the welding wire 16 using an actuator, such as a servomotor, as a power source. The forward feeding may be understood to include advancing the welding wire 16 so that a tip of the welding wire 16 approaches the workpiece W. The reverse feeding may be understood to include retracting the welding wire 16 so that the tip of the welding wire 16 moves away from the workpiece W.

Figure 2:
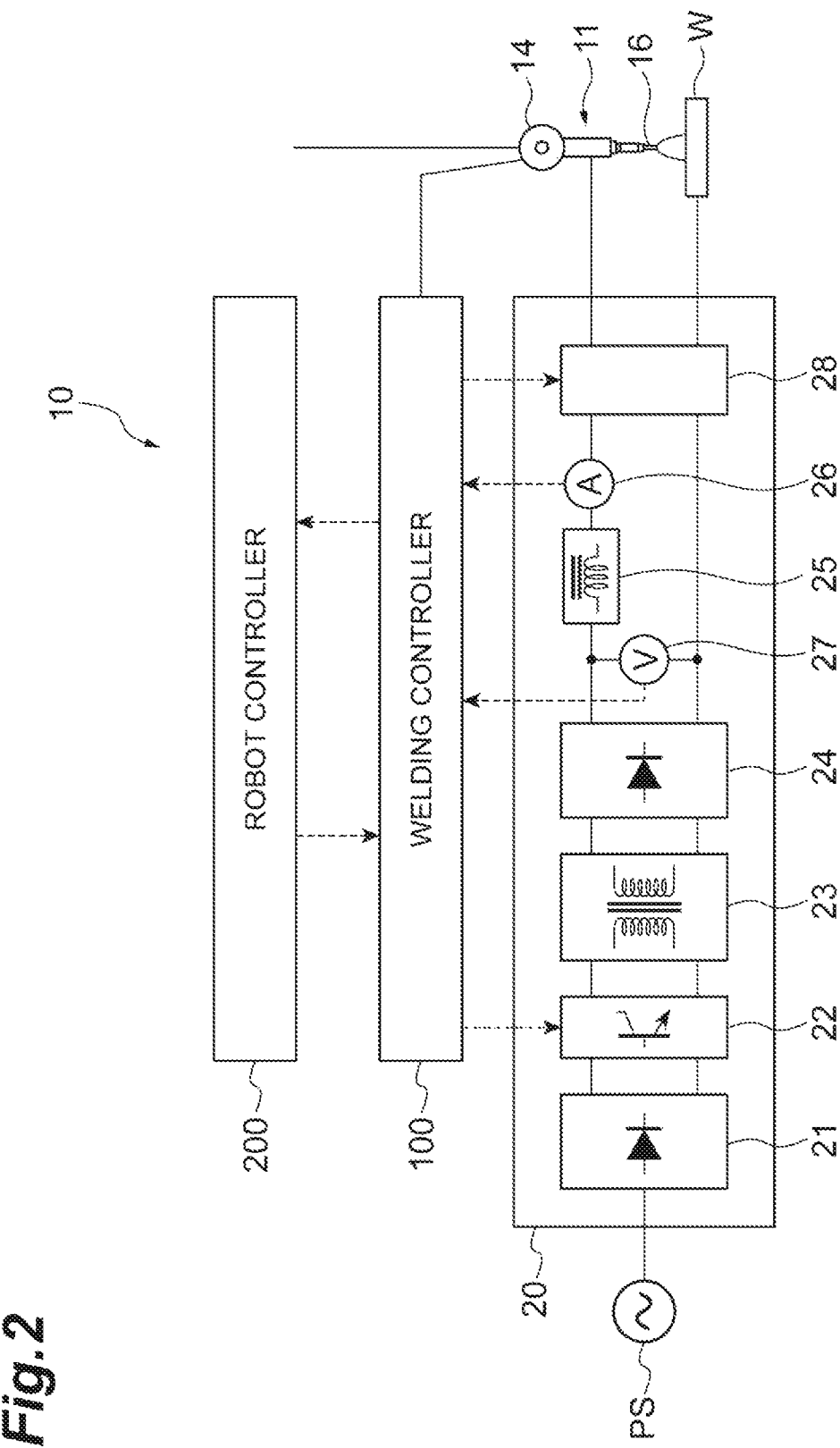
FIG. 2 is a schematic diagram illustrating an example configuration of a welding apparatus.

The welding power source 20 outputs current between the welding wire 16 and the workpiece W. As illustrated in FIG. 2, for example, the welding power source 20 includes a primary rectifier circuit 21, an inverter circuit 22, a transformer 23, a secondary rectifier circuit 24, a polarity switching unit 28, a reactor 25, and a current sensor 26, and a voltage sensor 27.

The primary rectifier circuit 21 converts AC power of a commercial power source PS into DC. The inverter circuit 22 converts DC power converted into DC by the primary rectifier circuit 21 into AC power of an amplitude and a frequency according to a control command. The transformer 23 changes a voltage and a current on the primary side while insulating the primary side (the inverter circuit 22 side) and the secondary side, and outputs power to the secondary side. The secondary rectifier circuit 24 converts AC power on the secondary side of the transformer 23 into DC, and outputs the power between the welding wire 16 and the workpiece W. The polarity switching unit 28 switches the polarity of the power output from the secondary rectifier circuit 24. In some examples, the polarity switching unit 28 switches between a positive polarity output by which the workpiece W becomes a positive electrode and a negative polarity output by which the workpiece W becomes a negative electrode. The reactor 25 smoothes the output power from the secondary rectifier circuit 24 (for example, the output power from the secondary rectifier circuit 24 to the polarity switching unit 28). The current sensor 26 detects output current from the secondary rectifier circuit 24. The voltage sensor 27 detects output voltage from the secondary rectifier circuit 24. Note that the polarity switching unit 28 may be built in the welding power source 20. In other examples, the polarity switching unit 28 may be configured as a unit separate from the welding power source 20, and may be interposed between the welding power source 20 and the welding wire 16 and the workpiece W.

Welding Controller

The welding controller 100 controls the feeding apparatus 14 and the welding power source 20 to perform supply of the welding wire 16 and power output to the welding wire 16 (power output between the welding wire 16 and the workpiece W) in accordance with a preset welding condition. For example, the welding controller 100 is configured to execute control of the welding power source 20 to alternately repeat a positive electrode peak period (or a positive peak period) for outputting a peak current with the workpiece W as a positive electrode and a negative electrode peak period (or a negative peak period) for outputting a peak current with the workpiece W as a negative electrode with interposing a base period for outputting a base current, and control of the welding power source 20 to make a transition, after the positive electrode peak period, to the negative electrode peak period, through a positive electrode base period for outputting a base current with the workpiece W as a positive electrode and a negative electrode base period for outputting a base current with the workpiece W as a negative electrode in this order. In some examples, the welding controller 100 may be configured to control the welding power source 20 to repeat a sequence including: outputting a positive peak current from the workpiece to the welding wire 16 during a positive peak period; outputting a positive base current from the workpiece W to the welding wire 16 and subsequently outputting a negative base current from the welding wire 16 to the workpiece W during a first base period, an absolute value of the positive base current and the negative base current being less than the positive peak current; and outputting a negative peak current from the welding wire 16 to the workpiece W during a negative peak period following the first base period, an absolute value of the negative peak current being greater than the absolute value of the positive base current and the negative base current.

The peak current is set to, for example, a magnitude that promotes melting of the welding wire 16 by heat generation. The base current is set to be smaller than the peak current, and is set, for example, to maintain an arc between the welding wire 16 and the workpiece W while not promoting the melting of the welding wire 16. The welding controller 100 may control the welding power source 20 to make a transition, after the negative electrode peak period, to the positive electrode peak period through the negative electrode base period and the positive electrode base period in this order. In some examples, the welding controller 100 may be further configured to control the welding power source 20 to repeat the sequence further including outputting the negative base current and subsequently outputting the positive base current during a second base period following the negative peak period.

Figure 3:
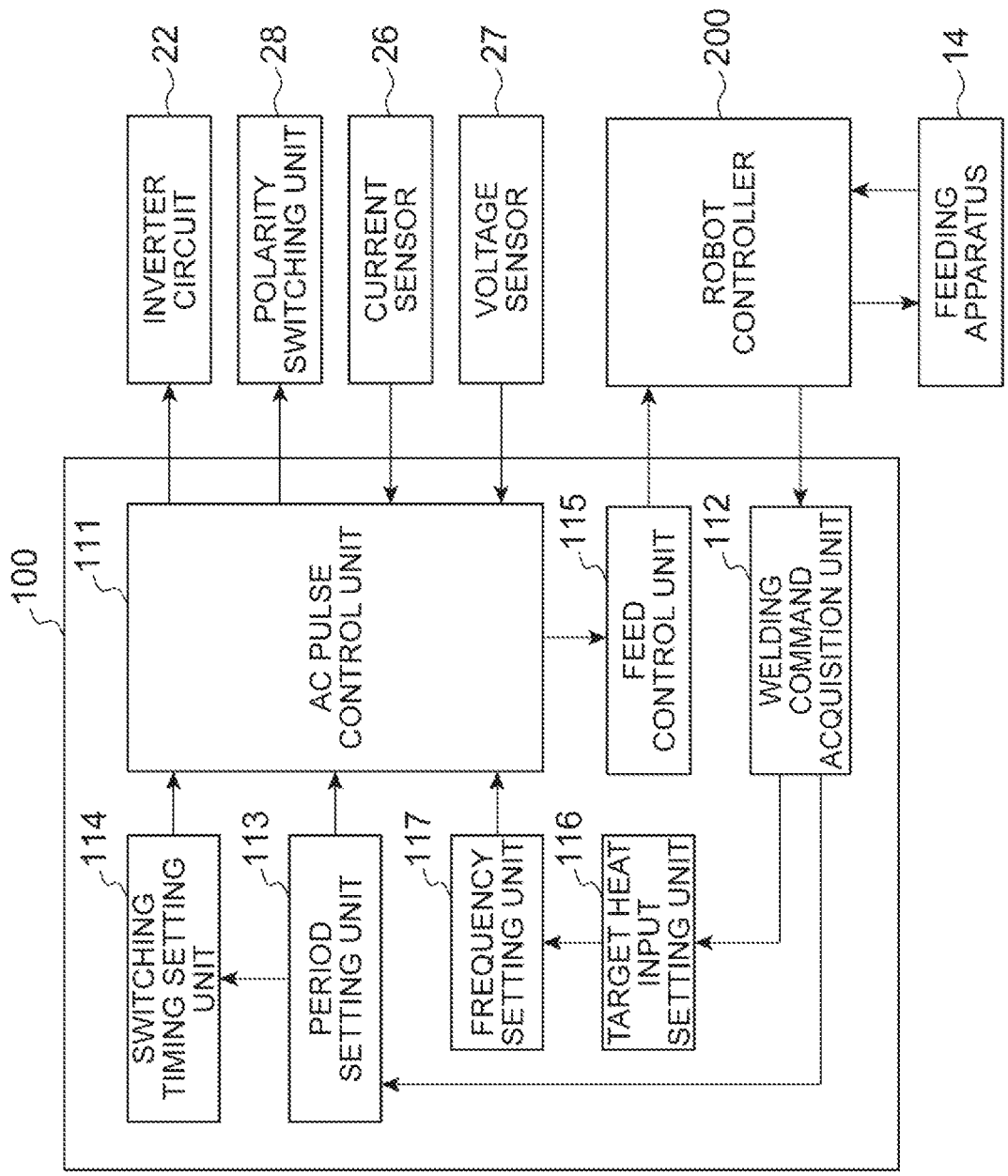
FIG. 3 is a block diagram illustrating an example functional configuration of a welding controller.

As illustrated in FIG. 3, for example, the welding controller 100 has an AC pulse control unit 111, a welding command acquisition unit 112, a period setting unit 113, a switching timing setting unit 114, and a feed control unit 115 as functional configurations (hereinafter referred to as "functional modules").

Figure 4:
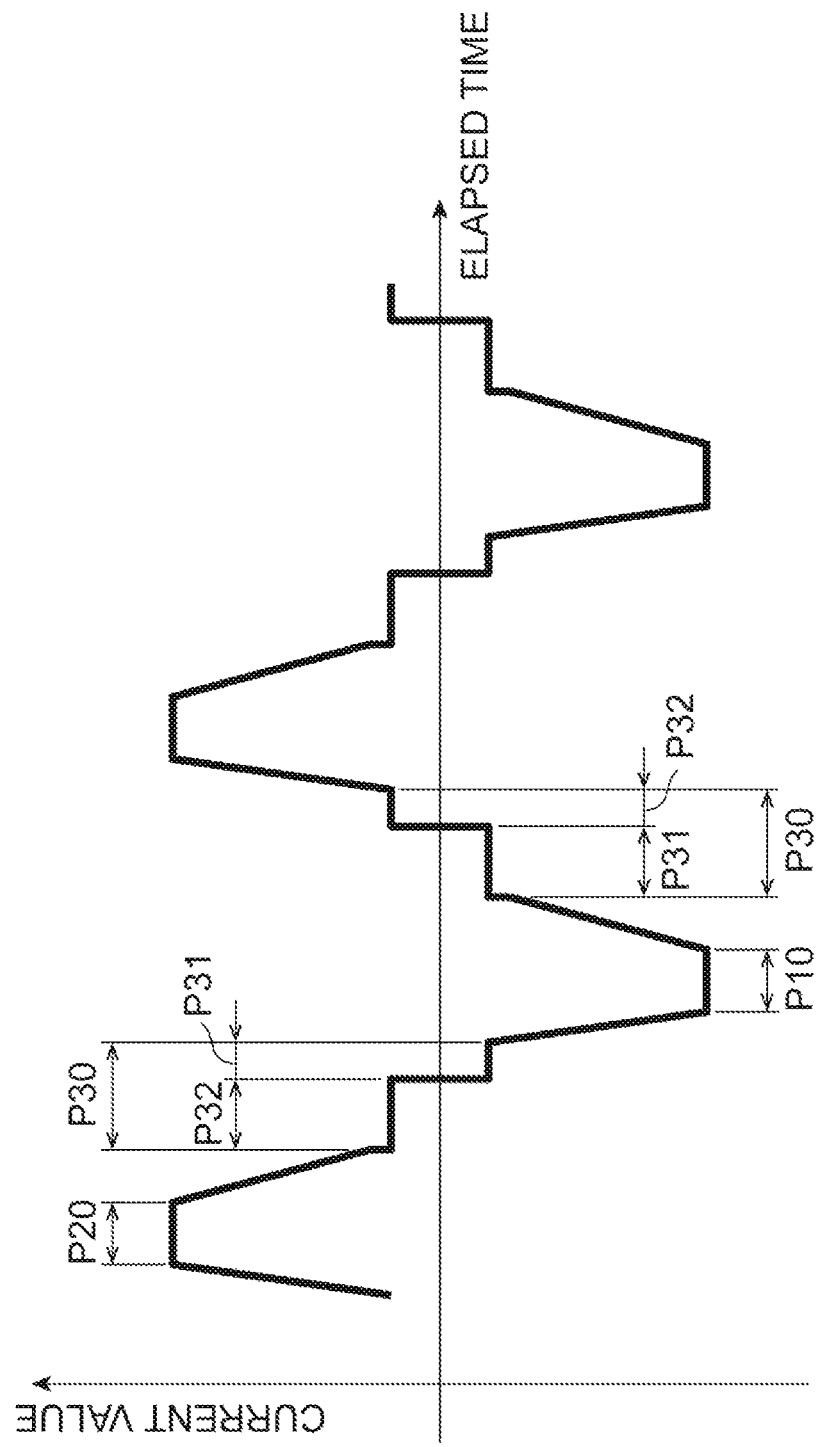
FIG. 4 is a graph illustrating an example current waveform.

The AC pulse control unit 111 controls the welding power source 20 as to alternately repeat the positive electrode peak period and the negative electrode peak period with interposing the base period. FIG. 4 is a graph which illustrates a waveform of current output by the welding power source 20 according to control by the AC pulse control unit 111. A horizontal axis of FIG. 4 shows elapsed time. A vertical axis of FIG. 4 indicates a current value, where a direction from the welding wire 16 toward the workpiece W side is positive. Therefore, in FIG. 4, a positive electrode peak period P10 is illustrated on the negative side, and a negative electrode peak period P20 is illustrated on the positive side.

As illustrated in FIG. 4, the AC pulse control unit 111 controls the welding power source 20 as to alternately repeat the positive electrode peak period P10 and the negative electrode peak period P20 with interposing a base period P30. More specifically, the AC pulse control unit 111 controls the inverter circuit 22 so as to cause a current value (for example, a current value detected by the current sensor 26) to follow a pattern in which the positive electrode peak period P10 and the negative electrode peak period P20 are alternately repeated with interposing the base period P30. The term "alternately repeated" includes a case where one of the positive electrode peak period P10 and one of the negative electrode peak period P20 are alternately repeated, as well as a case where a plurality of the positive electrode peak periods P10 and a plurality of the negative electrode peak periods P20 are alternately repeated.

The AC pulse control unit 111 controls the welding power source 20 to make a transition to the negative electrode peak period P20 through a positive electrode base period P31 and a negative electrode base period P32 in this order, after the positive electrode peak period P10, and controls welding power source 20 to make a transition to the positive electrode peak period P10 through the negative electrode base period P32 and the positive electrode base period P31 in this order, after the negative electrode peak period P20. Note that, it is not essential to make a transition to the positive electrode peak period P10 through the negative electrode base period P32 and the positive electrode base period P31 in this order, after the negative electrode peak period P20. After the negative electrode peak period P20, the AC pulse control unit 111 may control the welding power source 20 to make a transition to the positive electrode peak period P10 only through the negative electrode base period P32, may control the welding power source 20 to make a transition to the positive electrode peak period P10 only through the positive electrode base period P31, or may make a transition to the positive electrode peak period P10 through the positive electrode base period P31 and the negative electrode base period P32 in this order.

The welding command acquisition unit 112 acquires a welding command from another controller (for example, the robot controller 200). The welding command acquisition unit 112 may acquire a welding command based on the user's input to an operation panel or the like, instead of acquiring the command from robot controller 200. The welding command includes welding start and end commands and welding conditions. The welding conditions include at least one of a target bead width, a target penetration depth, a workpiece thickness, a target current, a target voltage, and a target feeding speed of the welding wire 16. The target current is, for example, a target for an average value of the magnitudes of current. The target voltage is, for example, a target for an average value of the magnitudes of voltages.

The period setting unit 113 sets at least a length of the base period P30 based on the target current. In some examples, the period setting unit 113 may be configured to change a length of time of the first base period and the second base period based on a target current. For example, the period setting unit 113 sets a length of the base period P30 such that an average value of the magnitudes of current output from the welding power source 20 matches the target current. The period setting unit 113 may change a length of the base period P30 by fixing lengths of the positive electrode peak period P10 and the negative electrode peak period P20, or may change both lengths of the positive electrode peak period P10 and the negative electrode peak period P20, and length of the base period P30.

The switching timing setting unit 114 sets a switching timing for polarity so as to make the negative electrode base period P32 longer than the positive electrode base period P31 between the end of the negative electrode peak period P20 and the start of the positive electrode peak period P10. In some examples, the welding controller 100 may be configured to output the negative base current for a longer period of time than the positive base current during the second base period. The switching timing setting unit 114 may set the switching timing for polarity so as to make the positive electrode base period P31 longer than the negative electrode base period P32 between the end of the positive electrode peak period P10 and the start of the negative electrode peak period P20. In some examples, the welding controller 100 may be configured to output the positive base current for a longer period of time than the negative base current during the first base period.

For example, the switching timing setting unit 114 sets, as a switching timing, a timing a predetermined time (hereinafter, referred to as "offset time") before the completion of the base period P30 set by the period setting unit 113. The offset time is preset to be less than half of a shortest period of a variable range of the base period P30 set by the period setting unit 113. In the base period P30 set by the period setting unit 113, the switching timing setting unit 114 may set the switching timing so that a ratio of periods before and after polarity switching has a predetermined value.

The feed control unit 115 controls the feeding apparatus 14 to feed the welding wire 16 to the workpiece W in accordance with a target feeding speed. Note that control of the feeding apparatus 14 includes a driver circuit for driving an actuator of the feeding apparatus 14. As this driver circuit, for example, a driver circuit for an external axis of the robot controller 200 (a driver circuit for an actuator other than the actuators 71, 72, 73, 74, 75, and 76 of the robot 40) can be used. In this case, the feed control unit 115 controls the feeding apparatus 14 via the robot controller 200.

The welding controller 100 may further include a target heat input setting unit 116 and a frequency setting unit 117. The target heat input setting unit 116 calculates a target heat input based on at least one of a target bead width, a target penetration depth, a workpiece thickness, a target current, a target voltage, and a target feeding speed. The heat input is an average amount of heat provided to a welded portion per unit time. For example, the target heat input setting unit 116 increases a target heat input as a target bead width, a target penetration depth, or a thickness of a workpiece increases.

The frequency setting unit 117 sets a positive electrode frequency for repeating the positive electrode peak period with interposing the positive electrode base period and a negative electrode frequency for repeating the negative electrode peak period with interposing the negative electrode base period based on the target heat input. In some examples, the welding controller 100 may be configured to: alternate between outputting the positive peak current and a first base current a first number of times during the positive peak period, an absolute value of the first base current being less than the positive peak current, the first number of times based on a target heat input; and alternate between outputting the negative peak current and a second base current a second number of times during the negative peak period, an absolute value of the second base current being less than an absolute value of the negative peak current, the second number of times based on the target heat input. For example, the frequency setting unit 117 sets the positive electrode frequency and the negative electrode frequency so that a ratio of the negative electrode period to the positive electrode period increases as the target heat input increases.

Figure 5:
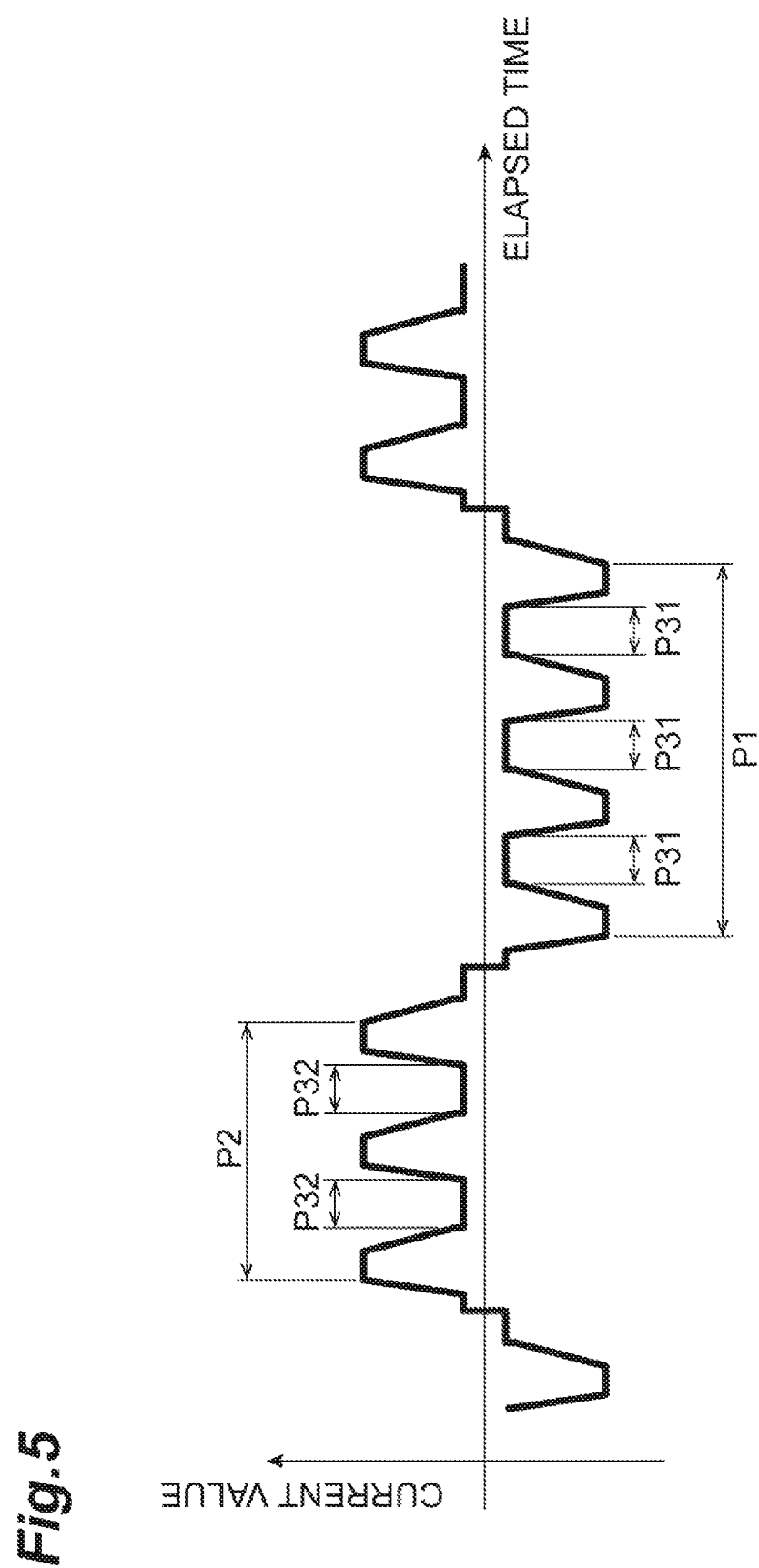
FIG. 5 is a graph showing another example of the current waveform.

In a case where the welding controller 100 has the target heat input setting unit 116 and the frequency setting unit 117, the AC pulse control unit 111 may control the welding power source 20 to alternately repeat, with interposing the base period P30, a positive electrode period P1 in which the positive electrode peak period P10 of the positive electrode frequency is repeated with interposing the positive electrode base period P31 and a negative electrode period P2 in which the negative electrode peak period P20 of the negative electrode frequency is repeated with interposing the negative electrode base period P32, as illustrated in FIG. 5.

Hardware Configuration of Controller

Figure 6:
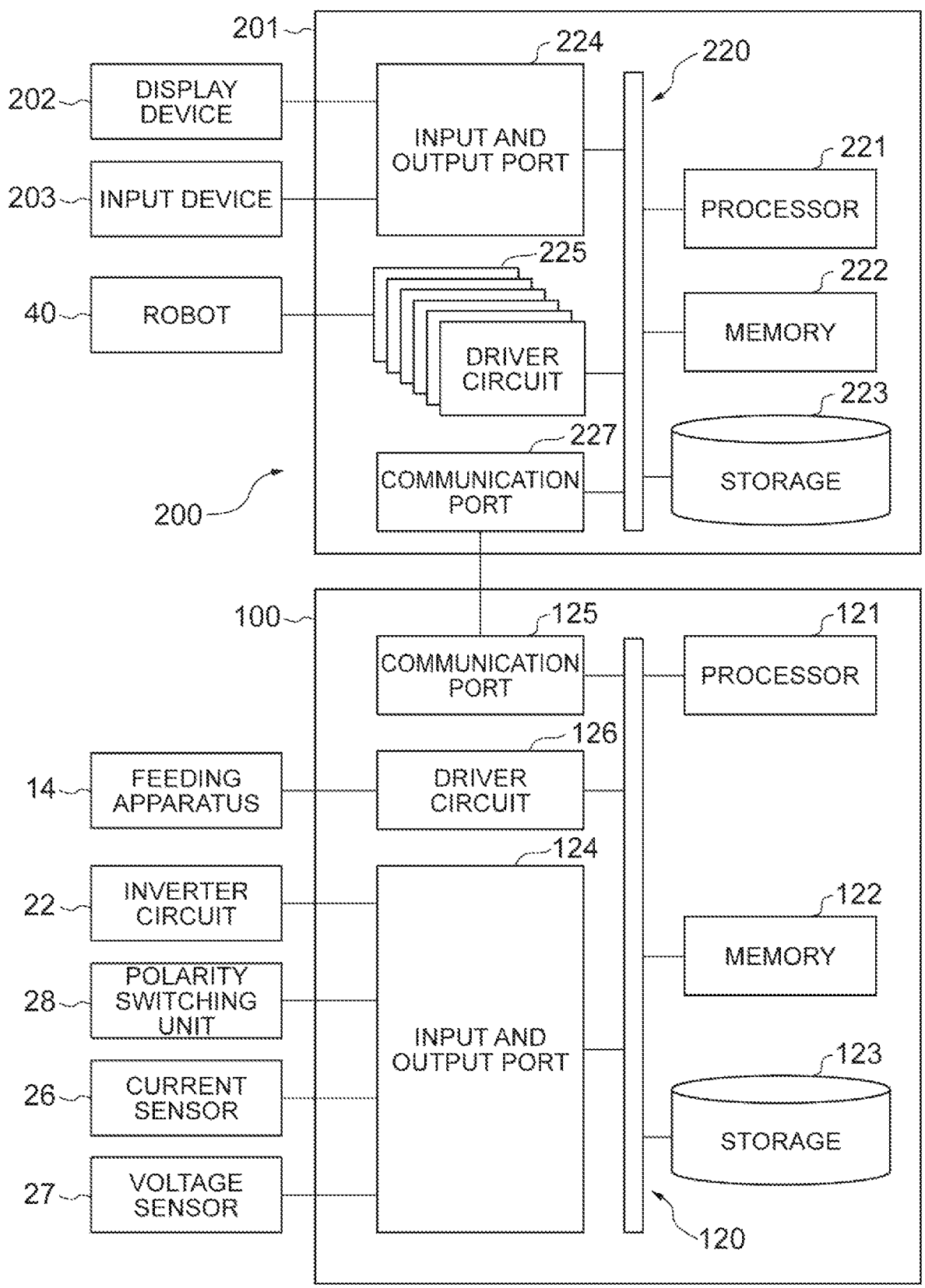
FIG. 6 is a block diagram illustrating an example hardware configuration of a robot controller and a welding controller.

FIG. 6 is a block diagram illustrating a hardware configuration of the robot controller and the welding controller. The welding controller 100 includes a circuit 120. The circuit 120 includes at least one processor 121, a memory 122, a storage 123, an input and output port 124, a driver circuit 126, and a communication port 125. The storage 123 is a non-volatile or non-transitive storage medium (for example, a flash memory) readable by a computer. For example, the storage 123 stores a program for causing the welding controller 100 to execute control of the welding power source 20 to alternately repeat the positive electrode peak period and the negative electrode peak period with interposing the base period, and control of the welding power source 20 to make a transition to the negative electrode peak period through the positive electrode base period and the negative electrode base period in this order after the positive electrode peak period. As an example, the storage 123 stores a program for configuring a variety of functional modules described above in the welding controller 100.

The memory 122 temporarily stores a program loaded from the storage 123, a calculation result by the processor 121, and the like. The processor 121 configures each functional module of the welding controller 100 by executing the program in cooperation with the memory 122. The driver circuit 126 drives an actuator of the feeding apparatus 14 in accordance with a command from the processor 121. The input and output port 124 inputs and outputs an electrical signal between the inverter circuit 22, the current sensor 26, the voltage sensor 27, and the polarity switching unit 28 in response to a command from the processor 121. The communication port 125 performs network communication with the robot controller 200 in response to a command from the processor 121. For example, the communication port 125 is used for acquisition of a welding command by the welding command acquisition unit 112.

The robot controller 200 includes a controller main body 201, a display device 202, and an input device 203. The display device 202 and the input device 203 function as a user interface of the robot controller 200. The display device 202 includes, for example, a liquid crystal monitor, and is used to display information to the user. The input device 203 is, for example, a foot switch or a keyboard, and acquires information input by the user. The display device 202 and the input device 203 may be integrated as what is called a touch panel. The display device 202 and the input device 203 are used for input of operation to the robot 40. The display device 202 and the input device 203 are also used by the user to input welding conditions.

The controller main body 201 includes a circuit 220. The circuit 220 includes at least one processor 221, a memory 222, a storage 223, an input and output port 224, a plurality of driver circuits 225, and a communication port 227. The storage 223 is a non-volatile storage medium (for example, a flash memory) readable by a computer. For example, the storage 223 stores a program for causing the robot controller 200 to execute control of the robot 40.

The memory 222 temporarily stores a program loaded from the storage 223, a calculation result by the processor 221, and the like. The processor 221 executes control of the robot 40 by executing the program in cooperation with the memory 222. A plurality of the driver circuits 225 drive the actuators 71, 72, 73, 74, 75, and 76 of the robot 40 in accordance with a command from the processor 221. The input and output port 224 inputs and outputs an electrical signal between the display device 202 and the input device 203 in response to a command from the processor 221. The communication port 227 performs network communication with the welding controller 100 in response to a command from the processor 221.

Welding Method

Next, an example welding procedure executed by the welding system 1 is illustrated as an example of a welding method. For example, the welding method includes output of current between the welding wire 16 and the workpiece W from the welding power source 20 and control of the welding power source 20 to alternately repeat the positive electrode peak period and the negative electrode peak period with interposing the base period, and the welding power source 20 is controlled to make a transition to the negative electrode peak period through the positive electrode base period and the negative electrode base period in this order after the positive electrode peak period. Hereinafter, the example welding procedure will be described by dividing the procedure into a setting procedure of detailed conditions of welding and a control procedure of the welding power source.

Setting Procedure of Detailed Conditions of Welding

Figure 7:
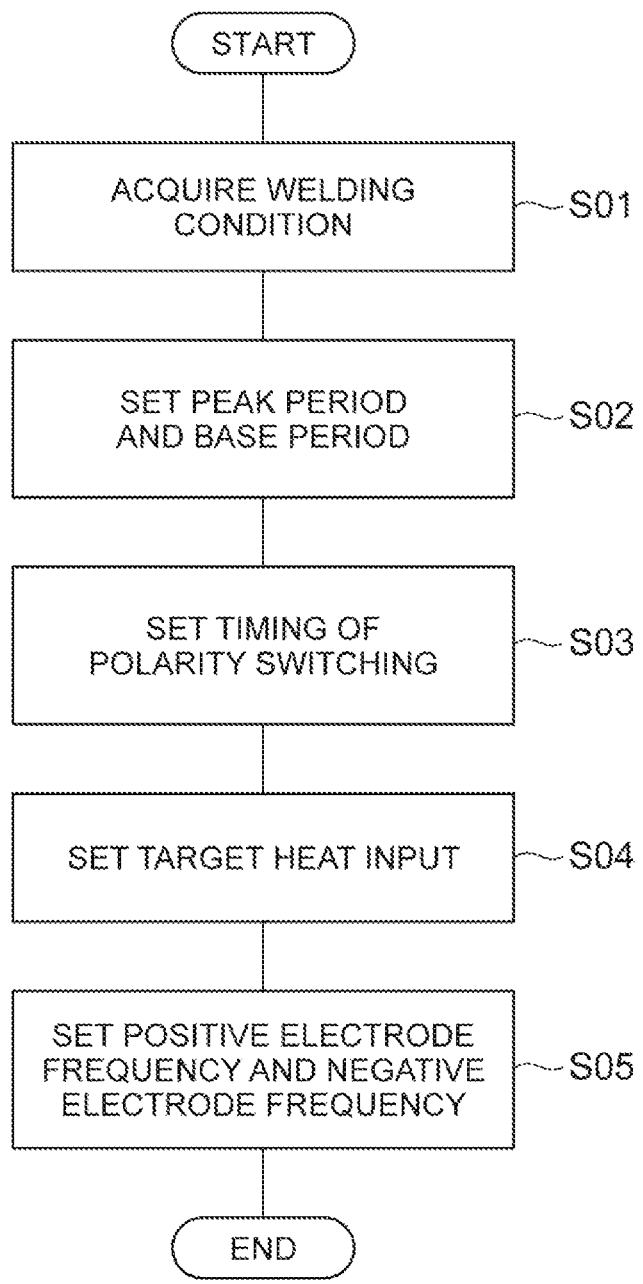
FIG. 7 is a flowchart illustrating an example setting procedure of detailed conditions of welding.

As illustrated in FIG. 7, the welding controller 100 first executes Operations S01, S02, and S03. In Operation S01, the welding command acquisition unit 112 acquires the welding conditions from the robot controller 200. In Operation S02, the period setting unit 113 sets lengths of the positive electrode peak period P10, the negative electrode peak period P20, and the base period P30 based on the target current. In Operation S03, the switching timing setting unit 114 sets the switching timing for polarity of the workpiece W and the welding wire 16. The switching timing setting unit 114 sets a switching timing for polarity so as to make the negative electrode base period P32 longer than the positive electrode base period P31 between the end of the negative electrode peak period P20 and the start of the positive electrode peak period P10. The switching timing setting unit 114 may set the switching timing for polarity so as to make the positive electrode base period P31 longer than the negative electrode base period P32 between the end of the positive electrode peak period P10 and the start of the negative electrode peak period P20.

Additionally, the welding controller 100 executes Operations S04 and S05. In Operation S04, the target heat input setting unit 116 calculates a target heat input based on at least one of a target bead width, a target penetration depth, a thickness of the workpiece W, a target current, a target voltage, and a target feeding speed. For example, the target heat input setting unit 116 increases a target heat input as a target bead width, a target penetration depth, or a thickness of a workpiece increases. In Operation S05, the frequency setting unit 117 sets the positive electrode frequency for repeating the positive electrode peak period with interposing the positive electrode base period and the negative electrode frequency for repeating the negative electrode peak period with interposing the negative electrode base period based on the target heat input. The setting procedure of the detailed conditions of welding is completed as described above. Note that the execution order of Operations S02 to S05 can be changed as appropriate. For example, Operations S02 and S03 may be executed after Operations S04 and S05.

Control Procedure of Welding Power Source

Figure 8:
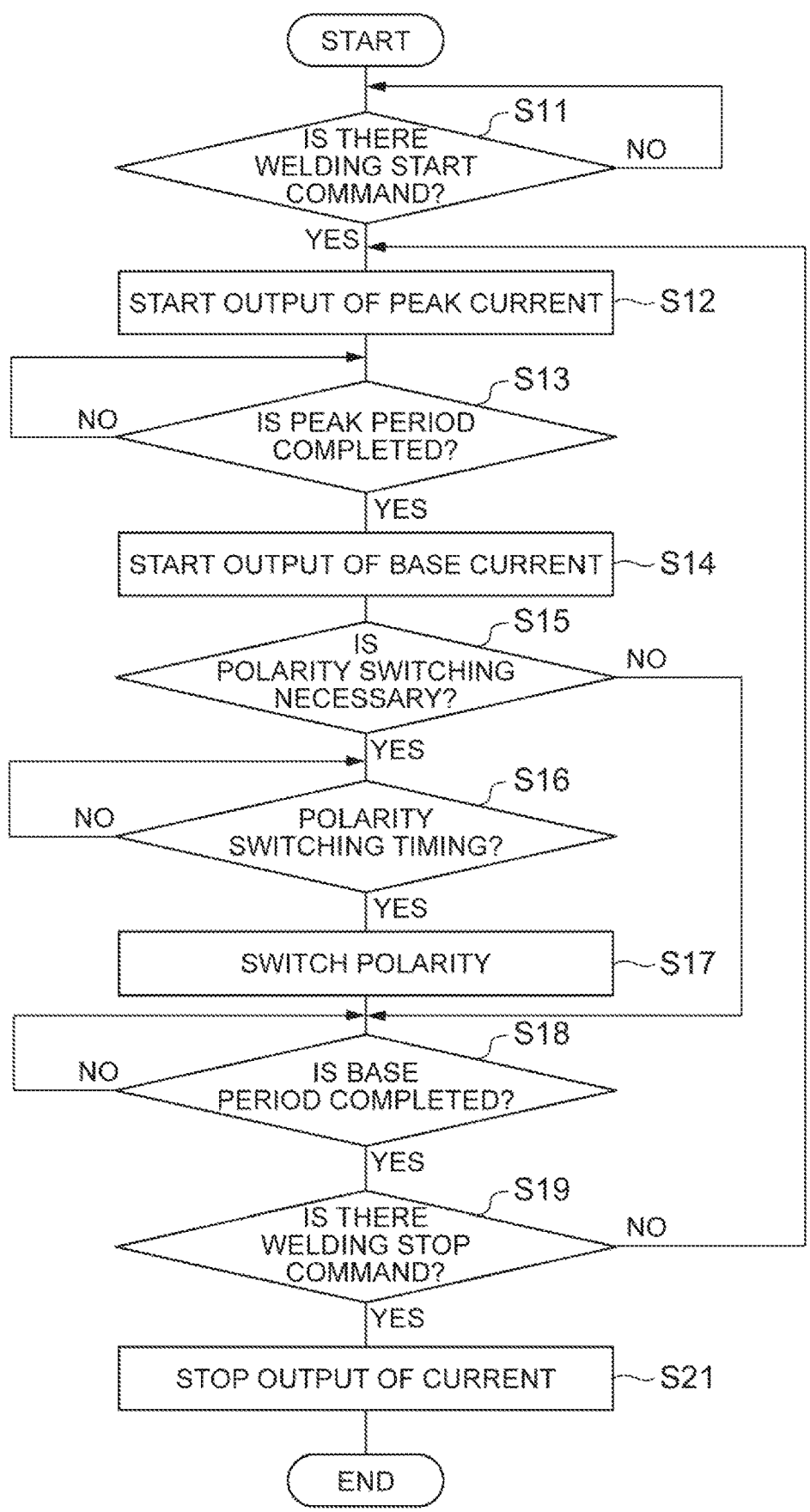
FIG. 8 is a flowchart illustrating an example control procedure of a welding power source.

As illustrated in FIG. 8, the welding controller 100 first executes Operations S11, S12, and S13. In Operation S11, the welding command acquisition unit 112 waits for acquisition of a welding start command from the robot controller 200. In Operation S12, the AC pulse control unit 111 controls the welding power source 20 so as to start output of the peak current with the workpiece W used as a positive electrode or a negative electrode. In Operation S13, the AC pulse control unit 111 waits for the peak period (the positive electrode peak period or the negative electrode peak period) to elapse.

Additionally, the welding controller 100 executes Operations S14 and S15. In Operation S14, the AC pulse control unit 111 controls the welding power source 20 so as to start output of the base current with the same polarity as that of a peak period immediately before. In Operation S15, the AC pulse control unit 111 determines whether it is necessary to switch the polarity. In a case where the polarity of a next peak period is different from the polarity of a peak period immediately before, the AC pulse control unit 111 determines that switching of the polarity is necessary. In a case where the polarity of the next peak period is the same as the polarity of the peak period immediately before, the AC pulse control unit 111 determines that switching of the polarity is unnecessary.

In a case where it is determined in Operation S15 that switching of the polarity is necessary, the welding controller 100 executes Operations S16 and S17. In Operation S16, the AC pulse control unit 111 waits for a switching timing for polarity. In Operation S17, the AC pulse control unit 111 switches the polarity of the workpiece W. In other words, the AC pulse control unit 111 reverses the polarity of the workpiece W and the welding wire 16.

Additionally, the welding controller 100 executes Operations S18 and S19. In a case where it is determined in Operation S15 that switching of the polarity is unnecessary, the welding controller 100 executes Operations S18 and S19 without executing Operations S16 and S17. In Operation S18, the AC pulse control unit 111 waits for the base period to elapse from the start of output of the base current. In Operation S19, the welding command acquisition unit 112 checks existence or non-existence of a welding stop command from the robot controller 200.

In a case where it is determined that no welding stop command exists in Operation S19, the welding controller 100 returns the processing to Operation S12. After that, until the welding stop command is acquired from the robot controller 200, the output of the peak current and the base current is repeated while switching of the polarity is performed.

In a case where it is determined in Operation S19 that there is the welding stop command, the welding controller 100 executes Operation S21. In Operation S21, the AC pulse control unit 111 controls the welding power source 20 so as to stop the output of the peak current and the base current. The control procedure of the welding power source 20 is completed as described above.

As described above, the welding apparatus 10 includes the welding power source 20 that outputs current between a consumable electrode and the workpiece W, and the AC pulse control unit 111 that controls the welding power source 20 to alternately repeat the positive electrode peak period P10 for outputting a peak current with the workpiece W as a positive electrode and the negative electrode peak period P20 for outputting a peak current with the workpiece W as a negative electrode with interposing the base period P30 for outputting a base current. The AC pulse control unit 111 controls the welding power source 20 to make a transition, after the positive electrode peak period P10, to the negative electrode peak period P20, through the positive electrode base period P31 for outputting a base current with the workpiece W as a positive electrode and the negative electrode base period P32 for outputting a base current with the workpiece W as a negative electrode in this order.

Between the end of the positive electrode peak period P10 and the start of the negative electrode peak period P20, two stages of transition periods, which are a base period in which the workpiece W side is a positive electrode (hereinafter referred to as "positive electrode base period P31") and a base period in which the workpiece W side is a negative electrode (hereinafter referred to as "negative electrode base period P32"), are interposed. In this manner, scattering of droplets grown in the positive electrode peak period P10 can be suppressed. Therefore, the present embodiment is effective in the improvement of welding quality.

The AC pulse control unit 111 may control the welding power source 20 to make a transition, after the negative electrode peak period P20, to the positive electrode peak period through the negative electrode base period P32 and the positive electrode base period P31 in this order. In this case, by interposing the positive electrode base period P31 between the end of the negative electrode base period P32 and the start of the positive electrode peak period P10, scattering of droplets remaining in the consumable electrode at the end of the negative electrode base period P32 can be suppressed. Therefore, the present embodiment is further effective in the improvement of welding quality.

The welding apparatus 10 may further include the switching timing setting unit 114 that sets a switching timing for polarity so as to make the negative electrode base period P32 longer than the positive electrode base period P31 between the end of the negative electrode peak period P20 and the start of the positive electrode peak period P10. In this case, by making the negative electrode base period P32 longer than the positive electrode base period P31 between the end of the negative electrode peak period P20 and the start of the positive electrode peak period P10, droplets can be reliably transferred from the consumable electrode to the workpiece W during the negative electrode base period P32. In this manner, scattering of droplets can be more reliably suppressed at the time of transition from the negative electrode base period P32 to the positive electrode base period P31. Therefore, the present embodiment is further effective in the improvement of welding quality.

The switching timing setting unit 114 may set the switching timing for polarity so as to make the positive electrode base period P31 longer than the negative electrode base period P32 between the end of the positive electrode peak period P10 and the start of the negative electrode peak period P20. In this case, the scattering of droplets grown in the positive electrode peak period P10 can be suppressed more reliably. Therefore, the present embodiment is further effective in the improvement of welding quality.

The welding apparatus 10 may further include the period setting unit 113 that sets a length of the base period P30 based on the target current. In this case, both of following the target current and suppressing the scattering of droplets can be achieved. Therefore, the present embodiment is further effective in the improvement of welding quality.

The welding apparatus 10 further includes the frequency setting unit 117 that sets the positive electrode frequency of repeating the positive electrode peak period P10 with interposing the base period P30 and the negative electrode frequency of repeating the negative electrode peak period P20 with interposing the base period P30 based on the target heat input. The AC pulse control unit 111 may control the welding power source 20 to alternately repeat, with interposing the base period P30, a positive electrode period in which the positive electrode peak period P10 of the positive electrode frequency is repeated with interposing the positive electrode base period P31 and a negative electrode period in which the negative electrode peak period P20 of the negative electrode frequency is repeated with interposing the negative electrode base period P32. In this case, both of following the target heat input and suppressing the scattering of droplets can be achieved. Therefore, the present embodiment is further effective in the improvement of welding quality.

It is to be understood that not all aspects, advantages and features described herein may necessarily be achieved by, or included in, any one particular example embodiment. Indeed, having described and illustrated various examples herein, it should be apparent that other examples may be modified in arrangement and detail.

We claim all modifications and variations coming within the spirit and scope of the subject matter claimed herein.

What is claimed is:

1. A welding apparatus comprising:
a welding power source configured to output current between a consumable electrode and a workpiece during a welding procedure; and
circuitry configured to control the welding power source to perform a sequence of operations that generates an AC waveform, the sequence of operations including:
outputting a positive peak current from the workpiece to the consumable electrode during a first positive peak period of the AC waveform, the first positive peak period indicating a positive polarity of the workpiece compared with the consumable electrode;
forming a welding droplet at the consumable electrode while outputting the positive peak current during the first positive peak period;
outputting a negative peak current from the consumable electrode to the workpiece during a negative peak period of the AC waveform following the first positive peak period, the negative peak period indicating a negative polarity of the workpiece compared with the consumable electrode;
outputting a negative base current from the consumable electrode to the workpiece during a transition period between the negative peak period and a second positive peak period of the AC waveform following the negative peak period, an absolute value of the negative peak current being greater than an absolute value of the negative base current;
transferring the welding droplet from the consumable electrode to the workpiece while outputting the negative base current during the transition period; and
outputting a positive base current from the workpiece to the consumable electrode during the transition period, after outputting the negative base current, an absolute value of the positive peak current being greater than an absolute value of the positive base current,
wherein, for the welding droplet that is transferred from the consumable electrode to the workpiece during the welding procedure, the circuitry is further configured to control the welding power source such that the negative base current is output for a longer period of time than the positive base current during the transition period between the negative peak period and the second positive peak period of the AC waveform.

2. The welding apparatus according to claim 1, wherein the sequence of operations further includes:
outputting the positive base current from the workpiece to the consumable electrode during a second transition period between the second positive peak period and a second negative peak period of the AC waveform following the second positive peak period; and
outputting the negative base current from the consumable electrode to the workpiece during the second transition period, after outputting the positive base current,
wherein the positive base current is output for a longer period of time than the negative base current during the second transition period between the second positive peak period and the second negative peak period of the AC waveform.

3. The welding apparatus according to claim 2, wherein the circuitry is further configured to control the welding power source to change a length of time of the transition period and the second transition period based on a target current.

4. The welding apparatus according to claim 2, wherein during the second transition period, the positive base current is output at a substantially constant positive value and the negative base current is output at a substantially constant negative value.

5. The welding apparatus according to claim 2, wherein the negative base current is output for a longer period of time during the transition period than the negative base current is output during the second transition period, and
wherein the positive base current is output for a longer period of time during the second transition period than the positive base current is output during the transition period.

6. The welding apparatus according to claim 1, wherein the circuitry is further configured to control the welding power source to:
alternate between outputting the positive peak current and a first base current a first number of times during the first positive peak period, an absolute value of the first base current being less than the positive peak current, the first number of times based on a target heat input; and
alternate between outputting the negative peak current and a second base current a second number of times during the negative peak period, an absolute value of the second base current being less than an absolute value of the negative peak current, the second number of times based on the target heat input.

7. The welding apparatus according to claim 6, wherein the first base current is the positive base current, and wherein the second base current is the negative base current.

8. A welding method for generating an AC waveform by outputting current between a consumable electrode and a workpiece during a welding procedure, the method comprising:
outputting a positive peak current from the workpiece to the consumable electrode during a first positive peak period of the AC waveform, the first positive peak period indicating a positive polarity of the workpiece compared with the consumable electrode;
forming a welding droplet at the consumable electrode while outputting the positive peak current during the first positive peak period;
outputting a negative peak current from the consumable electrode to the workpiece during a negative peak period of the AC waveform following the first positive peak period, the negative peak period indicating a negative polarity of the workpiece compared with the consumable electrode;
outputting a negative base current from the consumable electrode to the workpiece during a transition period between the negative peak period and a second positive peak period of the AC waveform following the negative peak period, an absolute value of the negative peak current being greater than an absolute value of the negative base current;
transferring the welding droplet from the consumable electrode to the workpiece while outputting the negative base current during the transition period; and
outputting a positive base current from the workpiece to the consumable electrode during the transition period, after outputting the negative base current, an absolute value of the positive peak current being greater than an absolute value of the positive base current,
wherein, for the welding droplet that is transferred from the consumable electrode to the workpiece during the welding procedure, the negative base current is output for a longer period of time than the positive base current during the transition period between the negative peak period and the second positive peak period of the AC waveform.

9. The welding method according to claim 8, further comprising:
outputting the positive base current from the workpiece to the consumable electrode during a second transition period between the second positive peak period and a second negative peak period of the AC waveform following the second positive peak period; and
outputting the negative base current from the consumable electrode to the workpiece during the second transition period, after outputting the positive base current,
wherein the positive base current is output for a longer period of time than the negative base current during the second transition period between the second positive peak period and the second negative peak period of the AC waveform.

10. The welding method according to claim 9, further comprising changing a length of time of the transition period and the second transition period based on a target current.

11. The welding method according to claim 9, wherein during the second transition period, the positive base current is output at a substantially constant positive value and the negative base current is output at a substantially constant negative value.

12. The welding method according to claim 9, wherein the negative base current is output for a longer period of time during the transition period than the negative base current is output during the second transition period, and
wherein the positive base current is output for a longer period of time during the second transition period than the positive base current is output during the transition period.

13. The welding method according to claim 8, further comprising:
alternating between outputting the positive peak current and a first base current a first number of times during the first positive peak period, an absolute value of the first base current being less than the positive peak current, the first number of times based on a target heat input; and
alternating between outputting the negative peak current and a second base current a second number of times during the negative peak period, an absolute value of the second base current being less than an absolute value of the negative peak current, the second number of times based on the target heat input.

14. The welding method according to claim 13, wherein the first base current is the positive base current, and wherein the second base current is the negative base current.

15. A non-transitory memory device having instructions stored thereon that, in response to execution by a processing device, cause the processing device to perform a sequence of operations for generating an AC waveform by outputting current between a consumable electrode and a workpiece during a welding procedure, the operations comprising:
outputting a positive peak current from the workpiece to the consumable electrode during a first positive peak period of the AC waveform, the first positive peak period indicating a positive polarity of the workpiece compared with the consumable electrode;

forming a welding droplet at the consumable electrode while outputting the positive peak current during the first positive peak period;

outputting a negative peak current from the consumable electrode to the workpiece during a negative peak period of the AC waveform following the first positive peak period, the negative peak period indicating a negative polarity of the workpiece compared with the consumable electrode;

outputting a negative base current from the consumable electrode to the workpiece during a transition period between the negative peak period and a second positive peak period of the AC waveform following the negative peak period, an absolute value of the negative peak current being greater than an absolute value of the negative base current;

transferring the welding droplet from the consumable electrode to the workpiece while outputting the negative base current during the transition period; and outputting a positive base current from the workpiece to the consumable electrode during the transition period, after outputting the negative base current, an absolute value of the positive peak current being greater than an absolute value of the positive base current, wherein, for the welding droplet that is transferred from the consumable electrode to the workpiece during the welding procedure, the negative base current is output for a longer period of time than the positive base current during the transition period between the negative peak period and the second positive peak period of the AC waveform.

16. The non-transitory memory device according to claim 15, the operations further comprising:

outputting the positive base current from the workpiece to the consumable electrode during a second transition period between the second positive peak period and a second negative peak period of the AC waveform following the second positive peak period; and outputting the negative base current from the consumable electrode to the workpiece during the second transition period, after outputting the positive base current, wherein the positive base current is output for a longer period of time than the negative base current during the second transition period between the second positive peak period and the second negative peak period of the AC waveform.

17. The non-transitory memory device according to claim 16, the operations further comprising changing a length of time of the transition period and the second transition period based on a target current.

18. The non-transitory memory device according to claim 16, wherein during the second transition period, the positive base current is output at a substantially constant positive value and the negative base current is output at a substantially constant negative value.

19. The non-transitory memory device according to claim 16, wherein the negative base current is output for a longer period of time during the transition period than the negative base current is output during the second transition period, and wherein the positive base current is output for a longer period of time during the second transition period than the positive base current is output during the transition period.

20. The non-transitory memory device according to claim 15, the operations further comprising:

alternating between outputting the positive peak current and a first base current a first number of times during the first positive peak period, an absolute value of the first base current being less than the positive peak current, the first number of times based on a target heat input; and alternating between outputting the negative peak current and a second base current a second number of times during the negative peak period, an absolute value of the second base current being less than an absolute value of the negative peak current, the second number of times based on the target heat input.

* * * * *